(12) United States Patent
Kinoshita

(10) Patent No.: US 9,368,315 B2
(45) Date of Patent: Jun. 14, 2016

(54) STREAK TUBE WITH CONNECTION LEAD TO REDUCE VOLTAGE PROPAGATION DIFFERENCES

(75) Inventor: Katsuyuki Kinoshita, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 86 days.

(21) Appl. No.: 14/354,942

(22) PCT Filed: Aug. 7, 2012

(86) PCT No.: PCT/JP2012/070077
§ 371 (c)(1),
(2), (4) Date: Apr. 29, 2014

(87) PCT Pub. No.: WO2013/065376
PCT Pub. Date: May 10, 2013

(65) Prior Publication Data
US 2014/0285085 A1 Sep. 25, 2014

(30) Foreign Application Priority Data
Oct. 31, 2011 (JP) .................. 2011-239485

(51) Int. Cl.
*H01J 31/42* (2006.01)
*H01J 29/08* (2006.01)
(Continued)

(52) U.S. Cl.
CPC ............... *H01J 31/42* (2013.01); *G01J 11/00* (2013.01); *H01J 29/08* (2013.01); *H01J 29/74* (2013.01); *H01J 29/92* (2013.01); *H01J 31/50* (2013.01); *G01J 2011/005* (2013.01)

(58) Field of Classification Search
CPC ......... H01J 31/42; H01J 31/50; H01J 31/501; H01J 31/502; H01J 29/385; H01J 29/74; H01J 29/90; H01J 29/92; H01J 29/925; H01J 2231/5016; H01J 2231/50063; G01J 11/00
USPC ................. 313/409, 414, 440, 441, 421, 530; 335/209, 210, 211, 213, 299, 302, 306; 348/215.1, 828–830; 250/214 VT
See application file for complete search history.

(56) References Cited

U.S. PATENT DOCUMENTS

| 4,310,857 A | * | 1/1982 | Lieber | ..................... | H01J 31/50 348/215.1 |
| 4,677,341 A | | 6/1987 | Kinoshita et al. | | |

(Continued)

FOREIGN PATENT DOCUMENTS

| JP | S61-250946 A | 11/1986 |
| JP | H2-230638 | 9/1990 |

(Continued)

OTHER PUBLICATIONS

Machine Translation of JP 2817936B, retrieved Sep. 9, 2015.*

(Continued)

*Primary Examiner* — Elmito Breval
*Assistant Examiner* — Steven Horikoshi
(74) *Attorney, Agent, or Firm* — Drinker Biddle & Reath LLP

(57) ABSTRACT

A steak tube has a container with an entrance plate and an output plate, a photocathode disposed in the container and configured to emit electrons according to light to be measured, the light having been incident through the entrance plate, and a sweep electrode disposed in the container, having a pair of deflection plates for generating an electric field and a connection lead connected to each deflection plate, and configured to sweep the electrons in a sweep direction along the output plate. An opposing of edges of the deflection plate in a direction of the output plate are formed so as to extend in a direction from the entrance plate to the output plate, the connection lead has a first connection portion electrically connected to the deflection plate, and the first connection portion is connected to the opposing of edges.

3 Claims, 19 Drawing Sheets

(51) Int. Cl.
*H01J 31/50* (2006.01)
*G01J 11/00* (2006.01)
*H01J 29/74* (2006.01)
*H01J 29/92* (2006.01)

(56) References Cited

U.S. PATENT DOCUMENTS 4,797,747 A * 1/1989 Takiguchi ............. G04F 13/026
250/214 VT
5,221,836 A 6/1993 Kinoshita 2006/0061273 A1 3/2006 Inagaki et al.

FOREIGN PATENT DOCUMENTS

JP H04-118530 A 4/1992
JP 2817936 B2 10/1998

OTHER PUBLICATIONS

English-language translation of International Preliminary Report on Patentability (IPRP) dated May 15, 2014 that issued in WO Patent Application No. PCT/JP2012/070077.

* cited by examiner

Fig.3
(a)
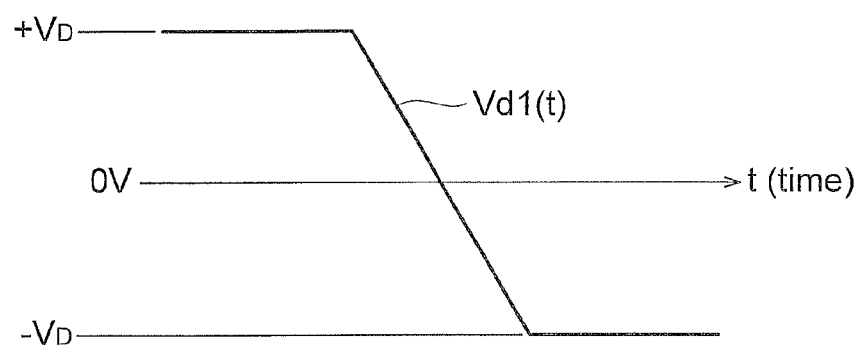
(b)
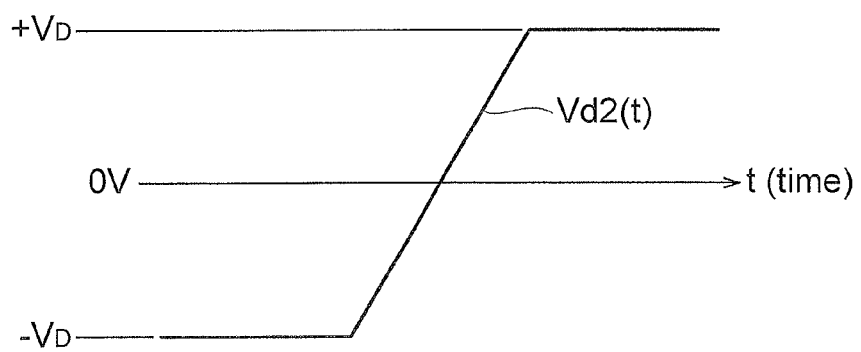

Fig.6
(a)
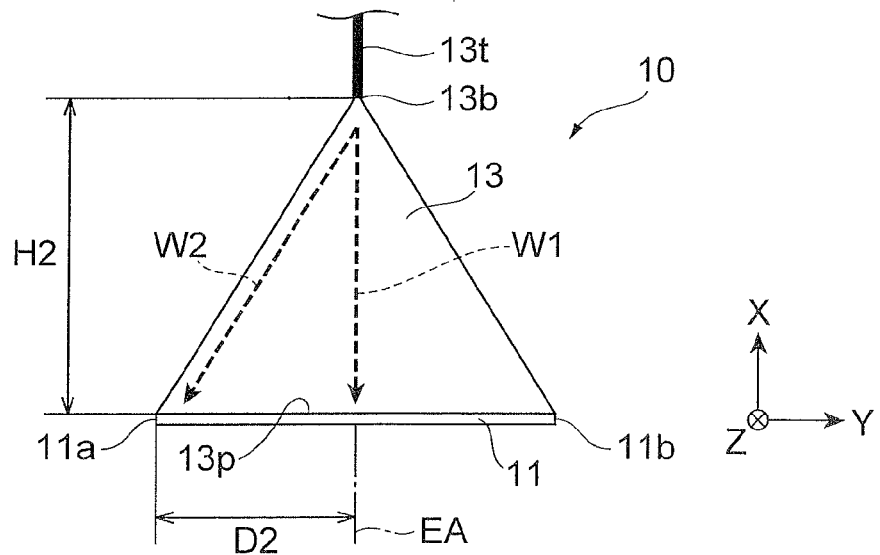
(b)
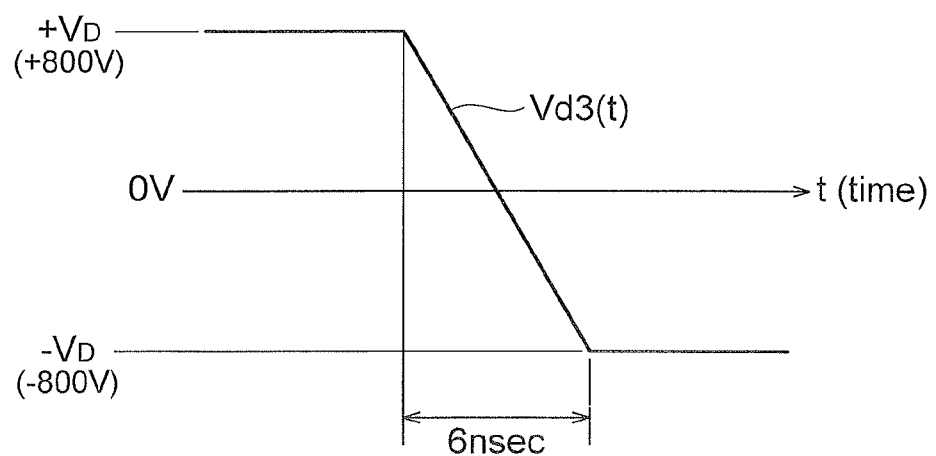

*Fig.17* PRIOR ART
(a)
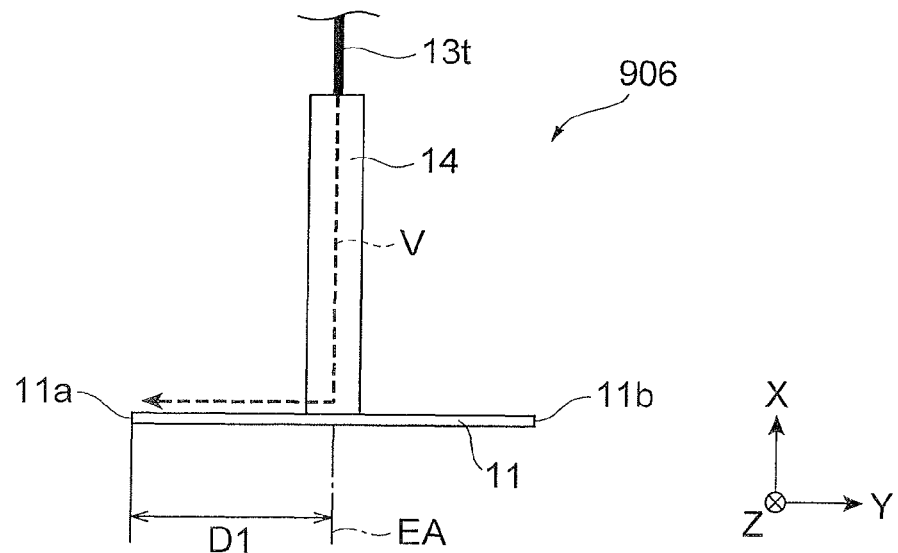
(b)
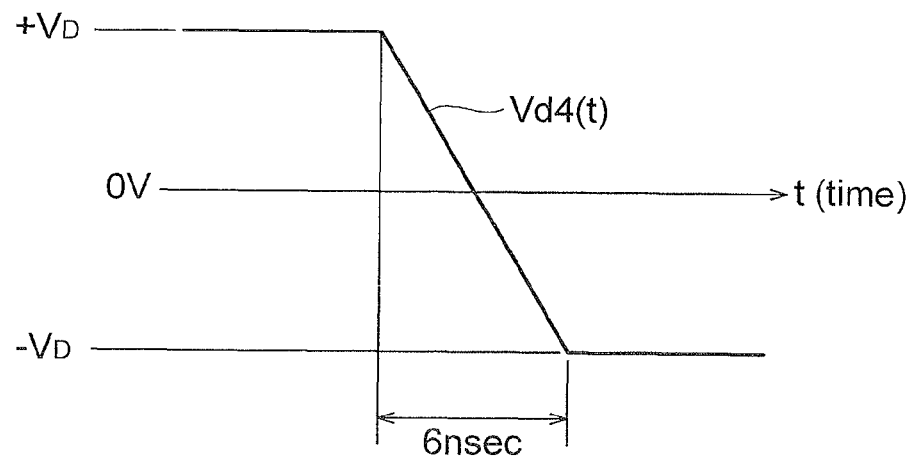

STREAK TUBE WITH CONNECTION LEAD TO REDUCE VOLTAGE PROPAGATION DIFFERENCES

TECHNICAL FIELD

The present invention relates to a streak tube for converting a temporal intensity distribution of light to be measured, into a spatial intensity distribution.

BACKGROUND ART

The streak tubes have been used heretofore as devices that convert a temporal intensity distribution of light to be measured, into a spatial intensity distribution on an output screen (cf. Patent Literatures 1 and 2 below). As shown in FIGS. 11 and 12, a conventional typical streak tube 900 has a configuration wherein inside a vacuum airtight container 902 with an entrance window 902a on one end face and an output window 902b on the other end face there are a mesh electrode 903, a focusing electrode 904, an aperture electrode 905, and a sweep electrode 906 arranged along the tube axis in the order named between the entrance window 902a and the output window 902b. A photocathode 907 is disposed on the container-interior-wall-surface side of the entrance window 902a and, a phosphor screen 908 on the container-interior-wall-surface side of the output window 902b.

The mesh electrode 903 has a structure in which a meshed electrode, for example, at the pitch of 1000 meshes/inch is provided at an end of a cylindrical electrode on the photocathode 907 side. The focusing electrode 904 is an axially symmetric cylindrical electrode. The aperture electrode 905 has a structure in which a circular disk having an aperture, for example, with the diameter of several mm is provided at an end of a short cylindrical electrode on the output window 902b side. The sweep electrode 906 is composed of two deflection plates arranged in symmetry with respect to the tube axis. A negative voltage, for example, of −3 kV is applied to the photocathode 907. A positive voltage, for example, of +3 kV is applied to the mesh electrode 903. A high voltage of positive polarity adjusted so as to optimally focus an electron beam on the phosphor screen 908 is applied to the focusing electrode 904. The ground potential (0 V) is applied to the aperture electrode 905 and the phosphor screen 908.

Light is guided from an external device to the streak tube 900 of this configuration to project a linear optical image A1 through the entrance window 902a onto the photocathode 907 so as to pass through the center of the photocathode 907. The optical image A1 is projected so as to make an angle of about 45° with the meshes of the mesh electrode 903 and be in parallel with the deflection plates of the sweep electrode 906, in order to avoid appearance of moiré pattern. Then, the photocathode 907 emits an electron beam in a linear distribution along a direction perpendicular to a normal to the photocathode 907, corresponding to the optical image A1. The linear electron beam is accelerated by the mesh electrode 903 and thereafter focused by the focusing electrode 904 to pass through the aperture electrode 905, travel through a gap between the deflection plates of the sweep electrode 906, and then impinge on the phosphor screen 908. As a consequence of this, a linear optical image A2 is generated from the output window 902b. On that occasion, in the duration in which the linear electron beam passes between the two deflection plates of the sweep electrode 906, slant sweep voltages varying with time are applied to those deflection plates. This operation results in sweeping the linear electron beam perpendicularly to its line direction and forming an array of linear optical images A2 arranged in order in the sweep direction on the phosphor screen 908, so as to form so-called streak images. Namely, a luminance distribution corresponding to a temporal change of intensity of the light to be measured is obtained in the sweep direction on the phosphor screen 908. When this is taken by a TV camera and processed by signal processing, we can obtain a temporal intensity profile of the light to be measured.

The linear electron beam is also focused in the direction perpendicular to the sweep direction on the phosphor screen 908 by the axially symmetric focusing lens system. Therefore, when optical images A1 of multiple channels are arranged in the line direction of the linear optical image A1 on the photocathode 907, linear optical images A2 are formed corresponding to the multiple channels on the phosphor screen 908. By sweeping these optical images of multiple channels, we can acquire data of temporal intensity changes about multiple beams of light at the same time. For example, we can acquire a time-resolved optical spectrum with input of output light from a spectroscope (multi-channel measurement).

CITATION LIST

Patent Literatures

Patent Literature 1: Japanese Patent Application Laid-Open Publication No. S61-250946
Patent Literature 2: Japanese Patent Application Laid-Open Publication No. H4-118530

SUMMARY OF INVENTION

Technical Problem

Incidentally, the sweep speed increases with increase of a changing amount per unit time of the sweep voltage applied to the sweep electrode 906. The sweep speed is related to time resolution of light intensity distribution. The Inventors confirmed that as the sweep speed was changed for control of the time resolution, a plurality of streak images were formed with variation in intervals between the streak images.

On the other hand, in the case of multi-channel spectroscopic measurement with the use of streak images, positions of the streak images on the phosphor screen correspond to wavelengths. For this reason, the variation of the positions of the streak images may lead to degradation of wavelength accuracy.

Under such circumstances, the present invention has been accomplished in view of the foregoing problem and it is an object of the present invention to provide a streak tube achieving implementation of high-accuracy multi-channel measurement while suppressing the variation of the positions of streak images.

Solution to Problem

A streak tube according to an aspect of the present invention comprises: a container having an entrance plate and an output plate; a photocathode disposed in the container and configured to emit electrons according to light to be measured, the light having been incident through the entrance plate; and a sweep electrode disposed in the container, having a pair of deflection plates for generating an electric field and a connection lead connected to each deflection plate, and configured to sweep the electrons in a sweep direction along the output plate. An opposing of edges of the deflection plate in a direction of the output plate are formed so as to extend in a direction from the entrance plate to the output plate. The connection lead has a first connection portion electrically connected to the deflection plate, and the first connection portion is connected to the opposing of edges.

The streak tube operates as follows: an electron beam is emitted according to the light be be measured, from the photocathode; the electron beam is converged by an axially symmetric electron lens composed of a focusing electrode and an aperture electrode; the electron beam is guided to a phosphor screen on the output plate while being swept in the sweep direction along the output plate by the sweep electrode. As a consequence of this operation, an output distribution corresponding to a temporal change of the light to be measured is obtained along the sweep direction. In this configuration, the connection lead connected to the deflection plate of the sweep electrode has the first connection portion connected to the opposing of edges of the deflection plate. This configuration decreases a propagation distance difference which is a difference between a distance from a part to which a voltage is applied, to a central part of the deflection plate and a distance from the part to which the voltage is applied, to each edge. Therefore, it reduces a potential difference between the central part and one edge of the deflection plate and a potential difference between the central part and the other edge of the deflection plate. Accordingly, it suppresses the variation of the positions of streak images on the phosphor screen, and thus achieves implementation of high-accuracy multi-channel measurement.

The streak tube according to one aspect of the present invention may have such a configuration that the first connection portion has a connection face connected to the opposing of edges. This configuration allows the connection lead to be readily connected to the deflection plate.

The streak tube according to one aspect of the present invention may have such a configuration that the container has a pin penetrating the container, that the connection lead is a plate member of a triangular shape one side of which is the first connection portion, and that the connection lead has a second connection portion electrically connected to the pin, at a vertex not including the one side of the plate member. This configuration decreases a propagation distance difference which is a difference between a distance from the second connection portion of the connection lead to which the voltage is applied, to the central part of the deflection plate and a distance from the second connection portion to one edge or the other edge. Therefore, it reduces the potential difference between the central part and one edge of the deflection plate and the potential difference between the central part and the other edge of the deflection plate. Accordingly, it suitably suppresses the variation of the positions of streak images on the phosphor screen.

The streak tube according to one aspect of the present invention may have such a configuration that the container has a pin penetrating the container, that the connection lead is a plate member of a trapezoid shape one of parallel sides of which is the first connection portion, and that the connection lead has a second connection portion electrically connected to the pin, at the other of the parallel sides of the plate member. This configuration allows the connection lead to be readily connected to the pin.

The streak tube according to one aspect of the present invention may have such a configuration that the container has a pin penetrating the container, that the connection lead has a second connection portion electrically connected to the pin, and that the first connection portion has a first end branching off from the second connection portion and connected to one of the opposing of edges and a second end branching off from the first connection portion and connected to the other of the opposing of edges. This configuration allows the distance from the second connection portion to one edge and the distance from the second connection portion to the other edge to be made shorter than the distance from the second connection portion to the center of the deflection plate. Therefore, it can further suppress the variation of the positions of streak images on the phosphor screen.

The streak tube according to one aspect of the present invention may have such a configuration that the connection lead comprises connection leads provided for the pair of deflection plates, respectively, and arranged at an identical position in a tube-axis direction of the container. This configuration keeps the sweep voltage at approximately symmetric values anywhere in the tube-axis direction at any time. Therefore, it can suppress disturbance of electric field distribution.

Advantageous Effect of Invention

The present invention successfully provides the streak tube achieving implementation of high-accuracy multi-channel measurement while suppressing the variation of the positions of streak images.

BRIEF DESCRIPTION OF DRAWINGS

FIG. 3 is a drawing showing voltage waveforms of slant sweep voltages applied to the sweep electrode.

FIG. 6 is a drawing for explaining the effect of the streak tube of the first embodiment.

FIG. 17 is a drawing for explaining the cause of the variation of the positions of streak images.

DESCRIPTION OF EMBODIMENTS

Embodiments of streak tubes according to the present invention will be described below in detail with reference to the accompanying drawings. The same elements will be denoted by the same reference signs in the description of the drawings, without redundant description.

Figure 1:
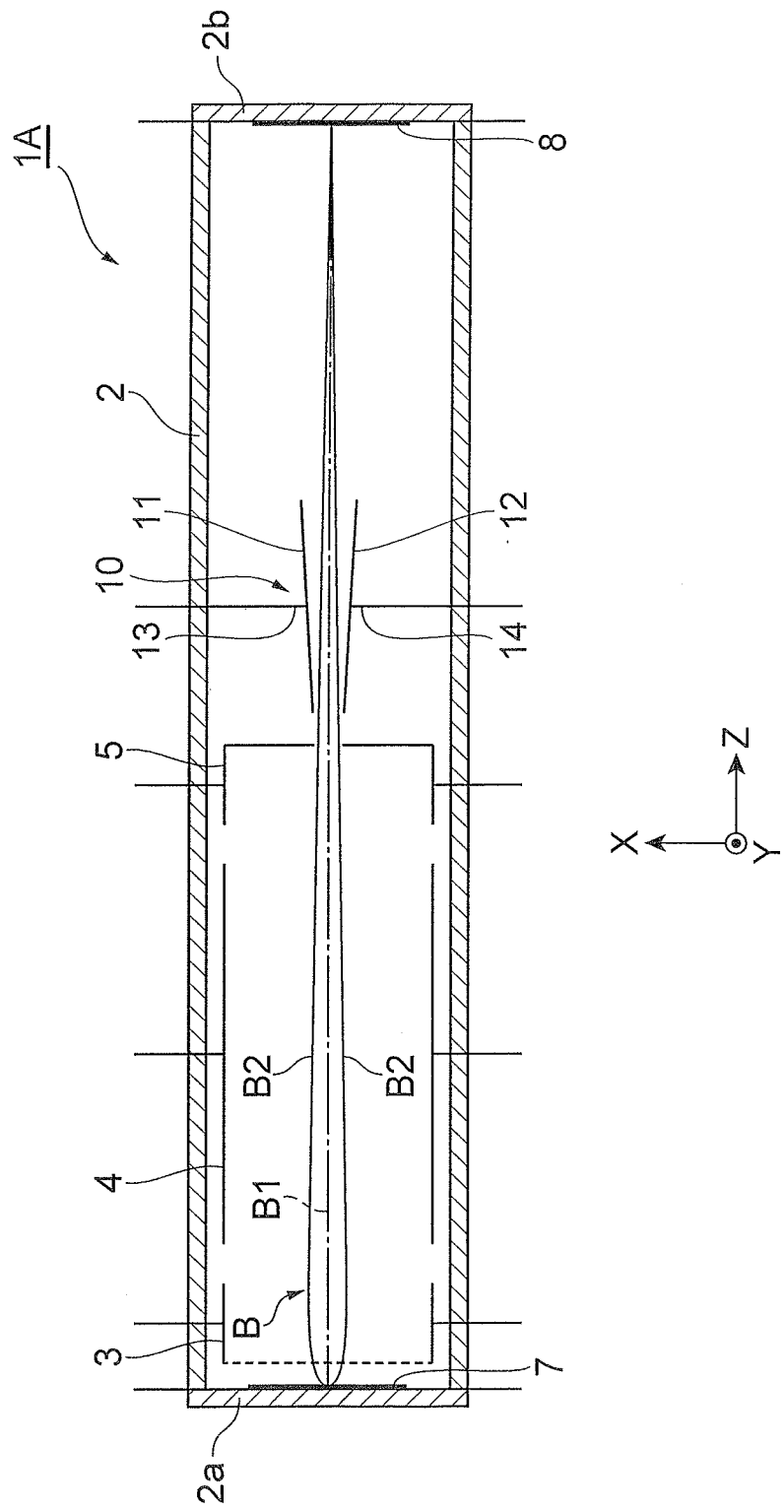
FIG. 1 is a drawing showing a cross section along a plane perpendicular to deflection plates of a sweep electrode in the streak tube of the first embodiment, including its tube axis.

FIG. 1 is a drawing showing a cross section along a plane perpendicular to the deflection plates of the sweep electrode in the streak tube 1A, including its tube axis. The streak tube 1A is a device for obtaining a luminance distribution corresponding to a temporal change of intensity of an optical image. The streak tube 1A has such a configuration that inside a container 2 there are a mesh electrode 3 (axially symmetric electron lens), a focusing electrode (axially symmetric electron lens) 4, an aperture electrode (axially symmetric electron lens) 5, and a sweep electrode 10 arranged. An entrance plate 2a of an optically transparent material to which light to be measured is guided is connected to one end face of the container 2. An output plate 2b of an optically transparent material from which an output image is output is connected to the other end face of the container 2. In the description hereinafter, a direction along the tube axis of the container 2 in FIG. 1 is defined as Z-axis direction, a direction (sweep direction) along the output plate 2b of the container 2 which is perpendicular to the deflection plates of the sweep electrode 6 is defined as X-axis direction, and a direction (spatial direction) along the output plate 2b of the container which is perpendicular to the X-axis is defined as Y-axis direction.

The streak tube 1A has a photocathode 7 formed on an inside face of the entrance plate 2a, and a phosphor screen 8 formed on an inside face of the output plate 2b. The photocathode 7 is a so-called transmission type photocathode that emits electrons toward the output plate 2b, according to the light to be measured, the light having been incident along the tube axis of the container 2 from the outside to the entrance plate 2a. The phosphor screen 8 outputs an output image according to an incident distribution of the electrons to the outside, in response to incidence of the electrons emitted from the photocathode 7.

The mesh electrode 3 is an electrode for acceleration of an electron beam which has such a shape that an end of a cylindrical electrode on the photocathode 7 side is covered by a mesh electrode. The mesh electrode 3 is arranged next to the photocathode 7 inside the container 2 so that a central axis of the cylindrical electrode is approximately coincident with the tube axis of the container 2. The mesh electrode 3 is arranged so that when a linear optical image along the Y-axis direction is incident to the entrance plate 2a, an angle of the optical image with meshes is approximately 45°, i.e., so that the meshes make 45° with respect to the X-axis (the Y-axis). This can prevent a moiré pattern from appearing in the output image. The spacing of the meshes is set, for example, to 1000 meshes/inch.

The focusing electrode 4 is an axially symmetric cylindrical electrode. The focusing electrode 4 is arranged next to the mesh electrode 3 inside the container 2 so that a central axis of the cylindrical electrode is approximately coincident with the tube axis of the container 2. The aperture electrode 5 is disposed next to the focusing electrode 4 on the opposite side to the mesh electrode 3. The aperture electrode 5 has such a configuration that an end of an axially symmetric cylindrical electrode on the phosphor screen 8 side is covered by a circular disk electrode with an aperture (opening) formed in a central region thereof. The aperture electrode 5 is arranged so that a central axis of the cylindrical electrode is approximately coincident with the tube axis of the container 2 and so that the aperture is located on the tube axis of the container 2.

The mesh electrode 3, focusing electrode 4, and aperture electrode 5 are an electrode group that forms an axially symmetric electron lens for focusing the electrons emitted from the photocathode 7, toward the phosphor screen 8. A predetermined negative potential (e.g., −3 kV) is applied to the photocathode 7. A predetermined positive potential (e.g., +3 kV) is applied to the mesh electrode 3. A high voltage of positive polarity is applied to the first focusing electrode 4. The ground potential (0 V) is applied to the aperture electrode 5 and the phosphor screen 8. The magnitude of the voltage applied to the focusing electrode 4 is so adjustable as to optimally focus the electron beam on the phosphor screen 8.

The inner diameter of the cylinders of the mesh electrode 3, focusing electrode 4, and aperture electrode 5 is, for example, 20 mm.

Figure 2:
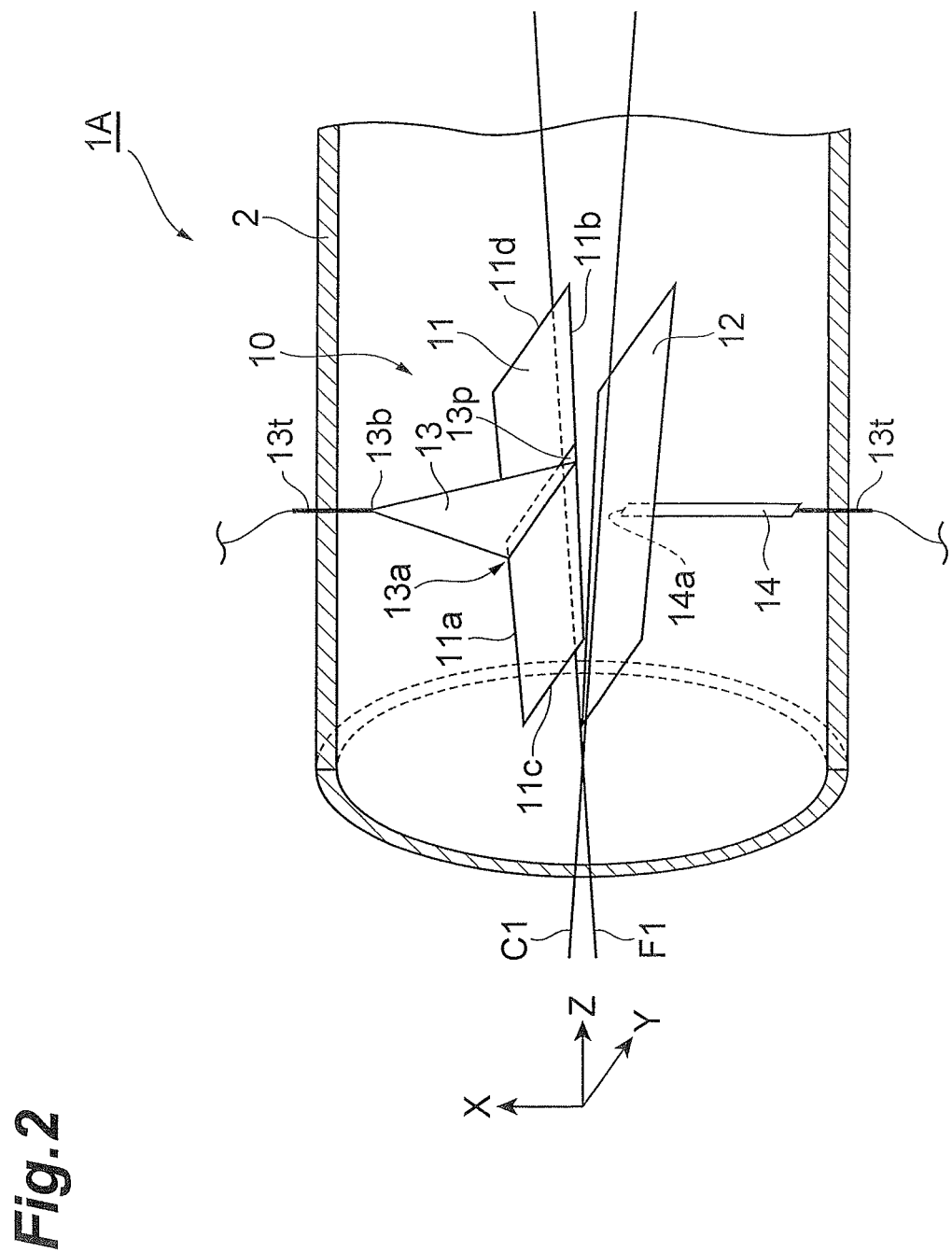
FIG. 2 is a drawing for explaining a configuration of the sweep electrode in the streak tube of the first embodiment.

The sweep electrode 10 will be described with reference to FIG. 2. The sweep electrode 10 has such a configuration that two planar electrodes (deflection plates) 11, 12 are arranged so as to face each other, along the direction (Y-axis) perpendicular to the X-axis on both sides of the tube axis of the container 2. The distance in the direction (X-axis direction) from the deflection plate 11 to the deflection plate 12 is set longer on the exit side of the electron beam than that on the entrance side of the electron beam. Namely, the spacing between the deflection plate 11 and the deflection plate 12 gradually increases along the tube axis (Z-axis direction). The sweep electrode 10 sweeps the electron beam having passed through the aperture electrode 5, in the X-axis direction with application of the sweep voltage to the two deflection plates 11, 12.

The deflection plate 11 is a platelike member of a trapezoid shape. The deflection plate 11 has one edge 11a and the other edge 11b constituting a pair of edges. The one edge 11a extends in the Z-axis direction. The other edge 11b extends in the Z-axis direction and is arranged opposite to the one edge 11a. Namely, the one edge 11a is separated by a predetermined distance from the other edge 11b in the Y-axis direction. The deflection plate 11 has a front edge 11c and a rear edge 11d connecting the one edge 11a and the other edge 11b. The front edge 11c is formed approximately in parallel with the rear edge 11d. The front edge 11c is an edge on the side where the electron beam B enters the sweep electrode 10. The rear edge 11d is an edge on the side where the electron beam B leaves the sweep electrode 10. The length of the front edge 11c is set shorter than the length of the rear edge 11d. For this reason, the front edge 11c corresponds to the upper base in the trapezoid shape and the rear edge 11d to the lower base in the trapezoid shape. In the present embodiment, the length of the deflection plate 11 is 30 mm. The length of the deflection plate 11 is defined by the distance from the front edge 11c to the rear edge 11d. The length of the front edge 11c being the upper base of the deflection plate 11 is 10 mm. The length of the rear edge 11d being the lower base of the deflection plate 11 is 20 mm.

A connection lead 13 is connected to the deflection plate 11. The connection lead 13 is a plate member of a triangle shape and has a first connection portion 13a as one side of the triangle. The first connection portion 13a has a connection face 13p. The connection face 13p is formed by folding the base part of the connection lead 13. The connection lead 13 is connected to the deflection plate 11, using the connection face 13p as a welding margin. When the connection lead 13 is connected to the deflection plate 11, the first connection portion 13a is connected to the one edge 11a of the deflection plate 11 and the other edge 11b of the deflection plate 11. Therefore, the length of the first connection portion 13a being the length of the base of the connection lead 13 is set to approximately the same length as the width of the deflection plate 11 at the location where the connection lead 13 is connected.

The connection lead 13 is connected to the deflection plate 11 along the Y-axis direction so that the length from the first connection portion 13a to the front edge 11c is approximately equal to the length from the first connection portion 13a to the rear edge 11d. Namely, the connection lead 13 is connected at the position of approximately a half in the longitudinal direction (Z-axis direction) of the deflection plate 11.

A second connection portion 13b is set at a vertex not including the first connection portion 13a in the connection lead 13. A pin 13t penetrating the container 2 is electrically connected to the second connection portion 13b. The thickness of the connection lead 13 is, for example, about 0.3 mm.

The deflection plate 12 is arranged so as to face along the direction (Y-axis direction) perpendicular to the X-axis with the tube axis of the container 2 in between. The deflection plate 12 has the same shape as the deflection plate 11.

A connection lead 14 is connected to the deflection plate 12. The connection lead 14 is a plate member of a rectangular shape and is provided with a third connection portion 14a at one end. The connection lead 14 is connected at a position which is approximately a center in the width direction of the deflection plate 12. The connection lead 14 is connected at a position which is approximately a center in the length direction of the deflection plate 11. The connection lead 14 is connected at the other end to a pin 13t penetrating the container 2.

Applied to the two deflection plates 11, 12 of the sweep electrode 10 are slant sweep voltages Vd1(t), Vd2(t) of opposite polarities (push-pull sweep voltages) as shown in FIG. 3(a) and FIG. 3(b). These slant sweep voltages Vd1(t), Vd2(t) are voltages varying linearly with time and are set to be voltages of mutually opposite polarities.

The operation of the streak tube 1A will be described with reference to FIG. 1. First, an optical image is guided through the entrance plate 2a to the photocathode 7. An electron beam B of a line shape corresponding to the light intensity of the optical image is emitted from the photocathode 7 to which the optical image is incident. The electron beam B is accelerated by the mesh electrode 3. FIG. 1 shows electron trajectories of a photoelectron group being the electron beam B emitted with an angular distribution from a predetermined point on the photocathode 7. In the electron beam B, a trajectory of electrons emitted at the initial speed of 0 meter per second is defined as primary trajectory B1 and a trajectory of electrons emitted at a predetermined initial speed and at a predetermined angle is defined as secondary trajectory B2.

The electron beam B is focused by the axially symmetric electron lens composed of the focusing electrode 4. Then, the size of the electron beam B in the Y-axis direction is the smallest near the aperture electrode 5. Then, the size of the electron beam B in the Y-axis direction gradually increases to the phosphor screen 8.

The electron beam B passing through the aperture electrode 5 travels through the gap between the deflection plates 11, 12 of the sweep electrode 10 to impinge on the phosphor screen 8. During the period of passage of the electron beam B between the deflection plates 11, 12 of the sweep electrode 10, the slant sweep voltages Vd1(t), Vd2(t) are applied to the deflection plates 11, 12. The electron beam B is swept in the direction perpendicular to the Y-axis direction and the electron beam B sequentially forms an array of images in the X-axis direction on the phosphor screen 8.

The phosphor screen 8 generates fluorescent optical images. The fluorescent optical images are emitted from the output plate 2b. The sizes of the fluorescent optical images on the phosphor screen 8 are determined based on a magnification ratio M of the focusing electrode 4. In the present embodiment, the magnification ratio M is, for example, threefold. In an example, where the length in the Y-axis direction of the optical image on the photocathode 7 is, for example, 4 mm, the length in the Y-axis direction of the fluorescent optical images is 12 mm.

The above-described step results in forming the fluorescent optical images separated from each other in the X-axis direction on the phosphor screen 8. The fluorescent optical images show a luminance distribution corresponding to a temporal change of light intensity of the optical image. By taking them with a camera or the like and signal-processing image data, we can obtain the luminance distribution corresponding to the temporal change of intensity of the optical image.

Figure 4:
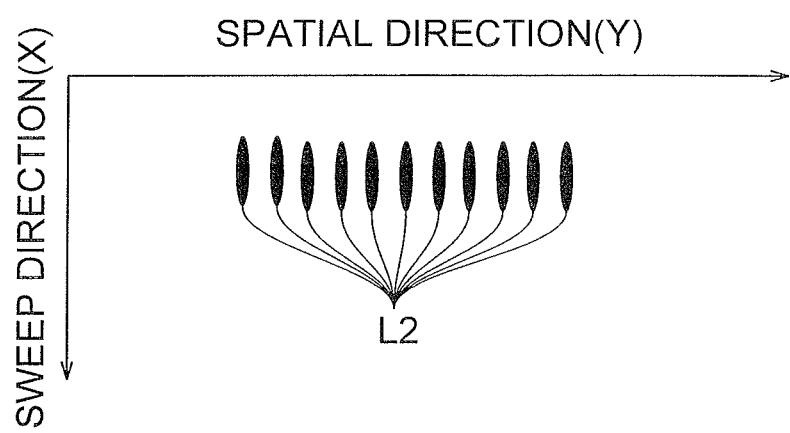
FIG. 4 is a drawing showing an example of streak images.

In multi-channel measurement, optical images being pulses of light to be measured, e.g., eleven channels are formed at equal intervals along the Y-axis direction on the photocathode 7. Then emitted electron beams B are swept at a very low sweep speed. This operation forms streak images as fluorescent optical images L2 arranged at approximately equal intervals in the Y-axis direction as shown in FIG. 4.

With the streak tube 1A according to the present embodiment, the photocathode 7 emits the electron beams B according to the light to be measured. The electron beams B are converged by the axially symmetric electron lens composed of the mesh electrode 3, focusing electrode 4, and aperture electrode 5 and are guided to the phosphor screen 8 on the output plate 2b while being swept in the sweep direction (X-axis direction) along the output plate 2b by the sweep electrode 10. As a consequence of this operation, an output distribution corresponding to a temporal change of the light to be measured is obtained along the sweep direction. The connection lead 13 connected to the deflection plate 11 of the sweep electrode 10 has the first connection portion 13a connected to the one edge 11a and the other edge 11b of the deflection plate 11. This configuration deceases a propagation distance difference which is a difference between a distance from the second connection portion 13b to which the voltage is applied, to the central part of the deflection plate 11 and a distance from the second connection portion 13b to the one edge 11a. Furthermore, it decreases a propagation distance difference which is a difference between the distance from the second connection portion 13b to which the voltage is applied, to the central part of the deflection plate 11 and a distance from the second connection portion 13b to the other edge 11b. Therefore, it reduces a potential difference between the central part and the one edge 11a of the deflection plate 11 and a potential difference between the central part and the other edge 11b of the deflection plate 11. Accordingly, it suppresses the variation of the positions of streak images on the phosphor screen 8 and thus achieves implementation of high-accuracy multi-channel measurement.

The connection leads 13, 14 are located at the same position in the tube-axis direction. This arrangement of the connection leads 13, 14 keeps the push-pull sweep voltages at almost symmetric values anywhere in the tube-axis direction at any time, which can reduce disturbance of electric field distribution. Furthermore, when the position is approximately the center between the front edge 11c and the rear edge 11d, the streak tube becomes mechanically stable as well.

The operational effect of the streak tube 1A of the present embodiment will be described in detail in comparison with a conventional example shown in FIGS. 13 to 19.

The problem of the streak tube according to the conventional example will be described. In general, the streak tube comes to have the larger sweep speed on the detection part with increase in slope of the voltage waveform of the sweep voltage applied to the sweep electrode. This can enhance the time resolution.

Figure 13:
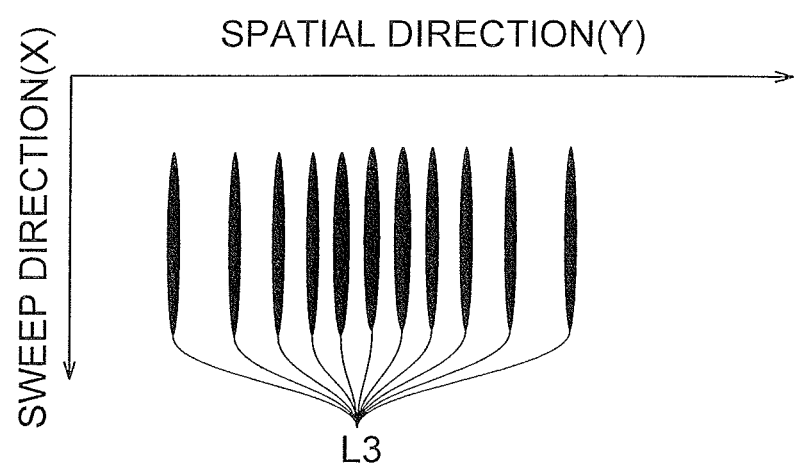
FIG. 13 is a drawing showing an example of streak images.

However, when the sweep speed is increased in order to enhance the time resolution, the streak images obtained are as shown in FIG. 13. In the streak images shown in FIG. 13, the intervals in the spatial direction (Y-axis direction) between the optical images L3 are not equal. The intervals between the optical images L3 increase toward the outside. The intervals between the optical images L3 increase in proportion to the sweep speed. Variations thereof are different among streak tubes.

As an example, when the sweep speed is set at $1.4 \times 10^8$ m/second, the optical image L3 has the outward variation of 0.48 mm at the position of 6 mm from the center in the spatial direction (Y-axis direction) on the phosphor screen. When the entire width in the spatial direction is 12 mm, the variation is 4% of the entire width in the spatial direction.

In the multi-channel spectroscopic measurement using the streak images, the positions of the streak images on the phosphor screen correspond to wavelengths. Therefore, the variation of the positions of streak images may degrade the accuracy of wavelengths.

The following will describe the cause of the above problem.

Figure 14:
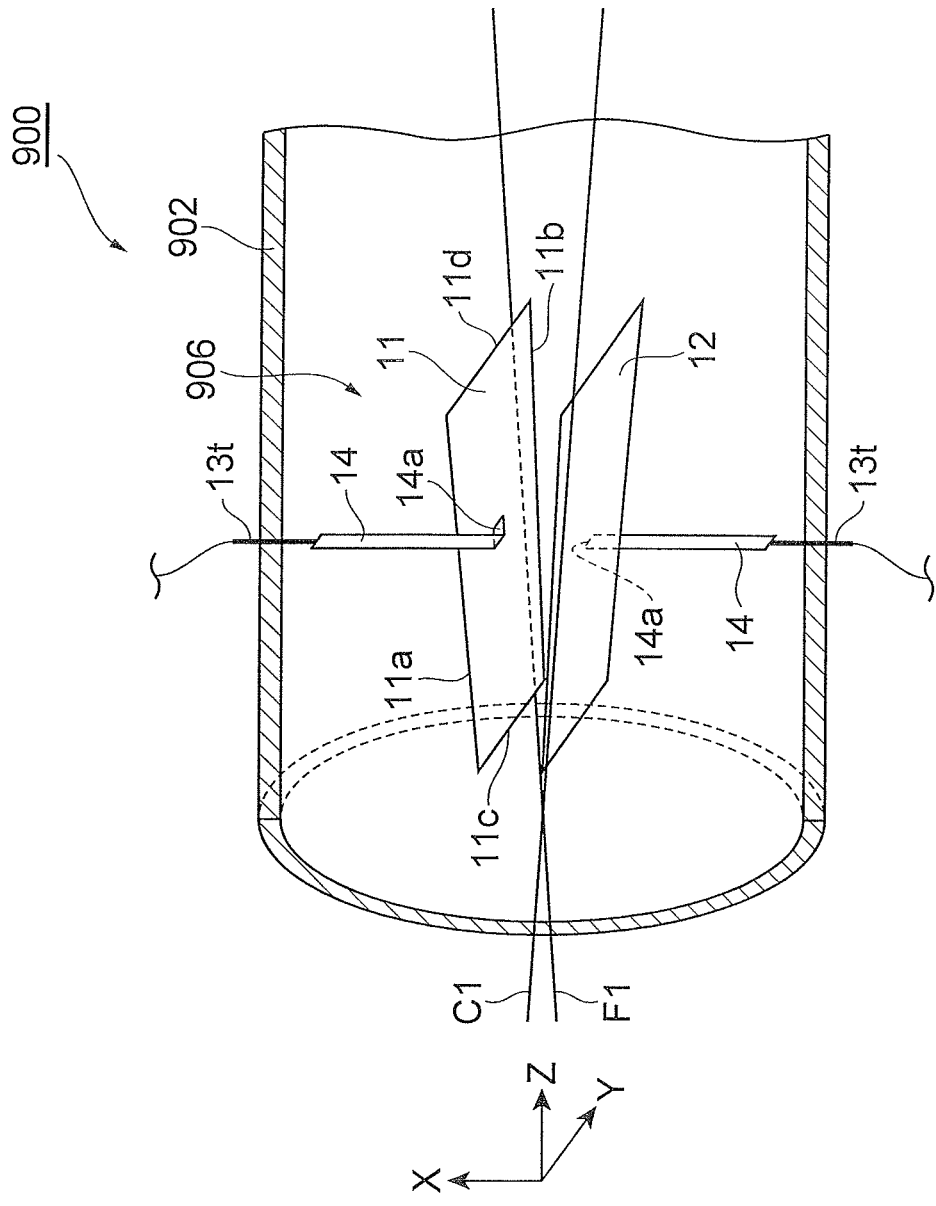
FIG. 14 is a drawing for explaining a configuration of the sweep electrode in the conventional streak tube.

FIG. 14 is a drawing for explaining the configuration of the sweep electrode 906 in the conventional streak tube 900. The sweep electrode 906 has the deflection plates 11, 12 to which connection leads 14 are connected. The streak tube 900 is different from the streak tube 1A of the present embodiment in that the connection leads 14 of the rectangular shape are connected to both of the pair of deflection plates 11, 12. The dimensions of the deflection plates 11, 12 are as follows: the length of the deflection plate 11 is 30 mm; the length of the upper base of the deflection plate 11 is 10 mm; the length of the lower base of the deflection plate 11 is 20 mm. The connection leads 14 have a platelike shape with the thickness of 0.5 mm and the width of 3 mm. The slant sweep voltages $Vd1(t)$, $Vd2(t)$ are applied through the pins $13t$ to the connection leads 14 and the deflection plates 11, 12. In FIG. 14, there are shown primary trajectories C1, F1 of photoelectrons emitted from the two ends in the Y-axis direction of the optical image. The two trajectories C1, F1 intersect near the aperture electrode 5 not shown, in front of the sweep electrode 906.

Figure 15:
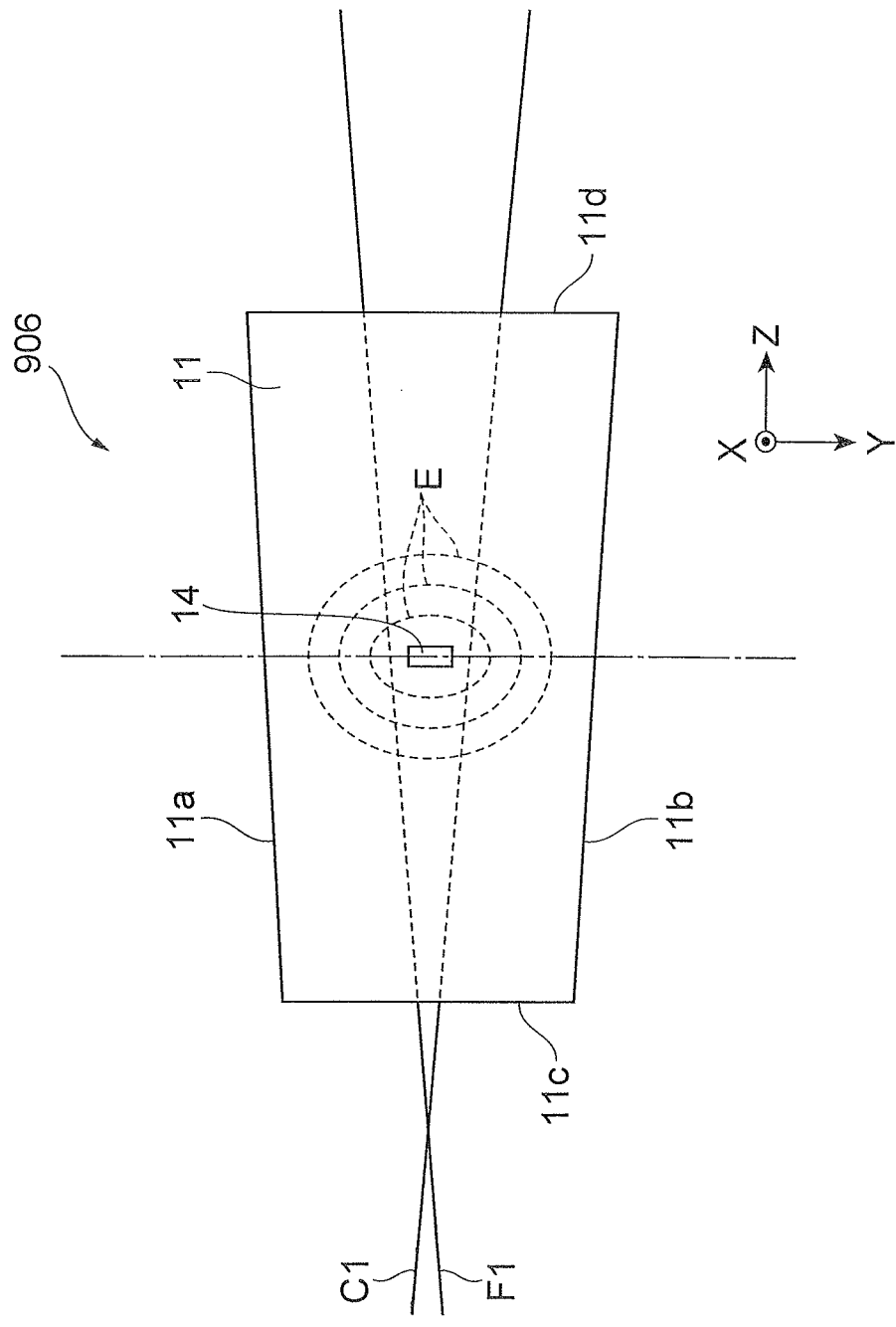
FIG. 15 is a drawing for explaining the cause of the variation of the positions of streak images.
Figure 16:
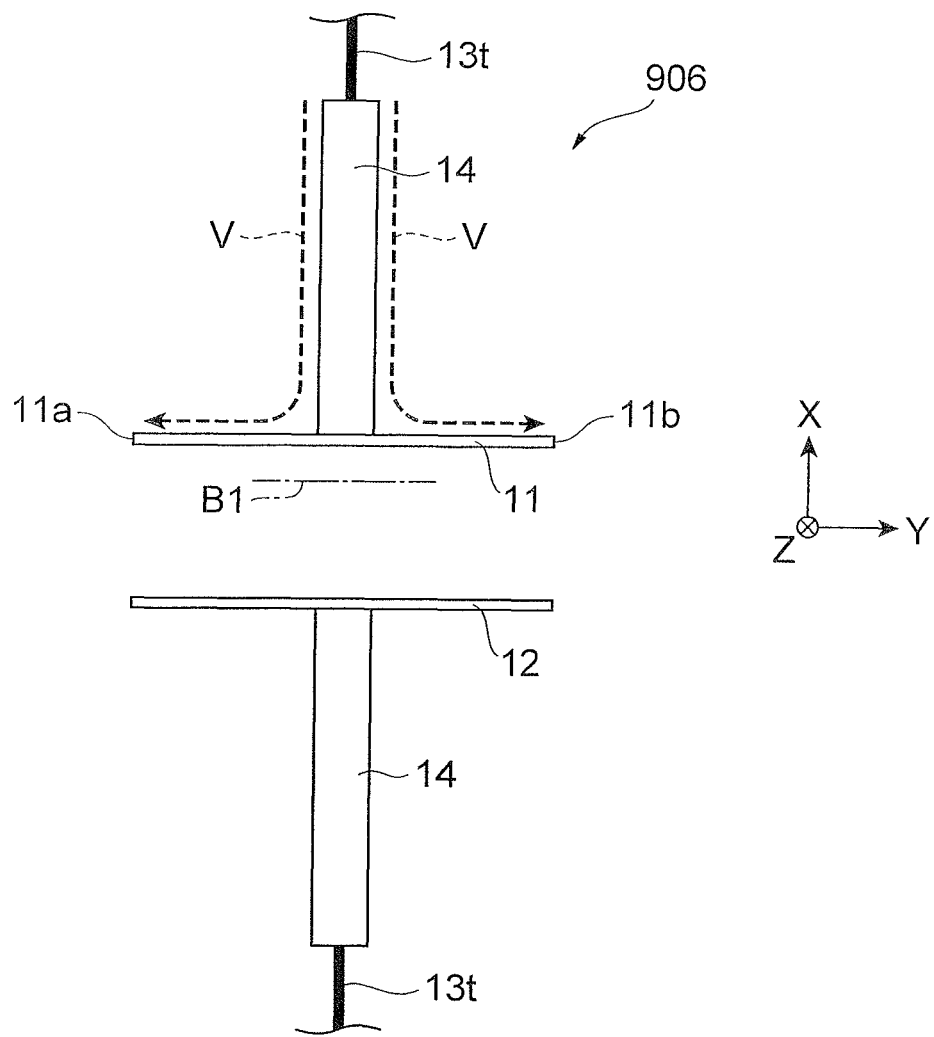
FIG. 16 is a drawing for explaining the cause of the variation of the positions of streak images.

FIGS. 15 and 16 are drawings for explaining the cause of the variation of the positions of the streak images, including a plan view of the deflection plate 11 shown in FIG. 14. FIG. 15 shows the deflection plate 11, the connection lead 14, and the primary trajectories C1, F1. FIG. 16 is a side view of the sweep electrode 906 in FIG. 15 from the photocathode 7 side.

Arrows V in FIG. 16 indicate directions of propagation on the connection lead 14 and the deflection plate 11, for the voltage applied from the pin $13t$. The voltage propagates from one end to the other end of the connection lead 14. The voltage propagates from the central part of the deflection plate 11 connected to the other end, to the one edge 11a and the other edge 11b of the deflection plate 11. As shown in FIG. 15, the voltage reaching the deflection plate 11 propagates on the deflection plate 11 from the place where the connection lead 14 is connected, to form an electric field indicated by equipotential lines E on concentric circles.

As long as the sweep speed is low, the voltages at respective places on the deflection plate 11 are approximately equal at each time. When the sweep speed is high, the voltages at respective places on the deflection plate 11 are different at each time. This is because the speed of propagation of voltage becomes unignorable with increase of the sweep speed.

The slant sweep voltage varying from the positive voltage to the negative voltage is applied to the deflection plate 11. For this reason, the deflection plate 11 comes to have the voltage higher near the one edge 11a and the other edge 11b than near the center of the deflection plate 11. For this reason, there are potential differences between the region near the center and the regions near the edges.

The potential differences between the region near the center and the regions near the edges of the deflection plate 11 will be discussed with reference to FIG. 17. The speed of light is used as an approximation for the propagation speed of the sweep voltage. The speed of light is $3 \times 10^8$ m/second. The distance D1 from the center EA to the one edge 11a of the deflection plate 11 is assumed to be 7.5 mm. Therefore, the time necessary for the voltage to propagate from the center EA to the one edge 11a of the deflection plate 11 is 25 psec (picosecond). The voltage waveform of the slant sweep voltage $Vd4(t)$ is shown in FIG. 17(b). In this case, the voltage applied to the deflection plate 11 changes from +800 V to −800 V in the period of 6 nsec (nanosecond). Therefore, the slope of the sweep voltage is about 0.267 V/psec (1600 V/6000 psec). Accordingly, the voltage at the one edge 11a in the deflection plate 11 at each time is approximately 6.7 V (0.267 V/psec×25 psec) higher than at the central part.

On the other hand, the sweep voltage varying from the negative voltage to the positive voltage is applied to the lower deflection plate 12. Therefore, the voltage at the edges of the deflection plate 12 is approximately 6.7 V lower than the voltage at the center of the deflection plate 12.

Figure 18:
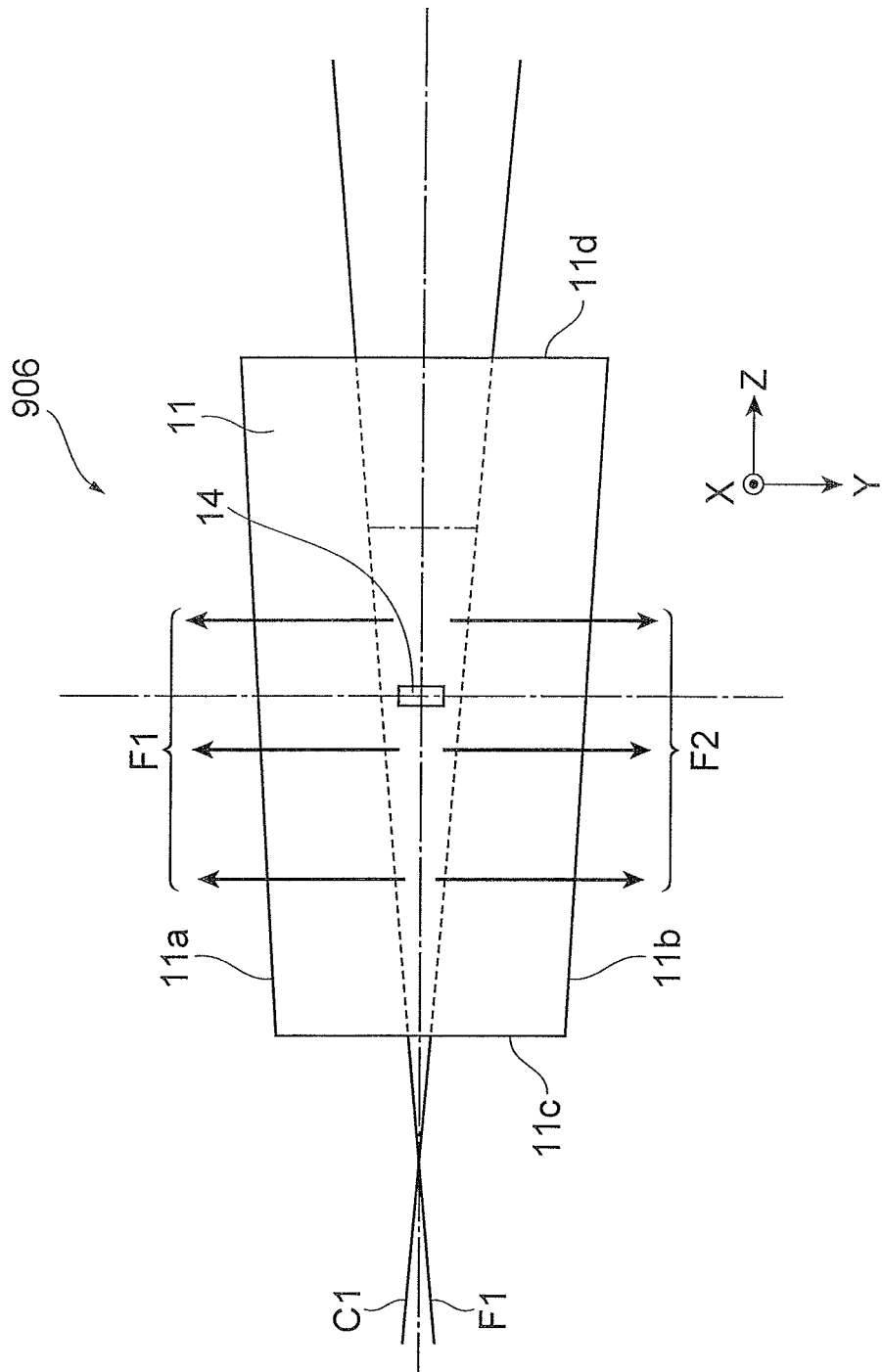
FIG. 18 is a drawing for explaining the cause of the variation of the positions of streak images.

Near the upper deflection plate 11, while the sweep voltage propagates from the center of the deflection plate 11 to which the connection lead 14 is connected, to each position of the deflection plate 11, an electric field based on the potential differences in the spatial direction (Y-axis direction) of the deflection plate 11 acts on photoelectrons. As shown in FIG. 18, this action causes forces F1 in the direction from the tube axis to the one edge 11a and forces F2 in the direction from the tube axis to the other edge 11b to be applied to the photoelectrons during the duration of migration of the photoelectrons through the sweep electrode 906. On the other hand, near the lower deflection plate 12, forces in the direction from the one edge 11a to the tube axis, i.e., forces opposite to the forces F1 and forces in the direction from the other edge 11b to the tube axis, i.e., forces opposite to the forces F2 are applied to the photoelectrons during the duration of migration of the photoelectrons through the sweep electrode 906.

Figure 19:
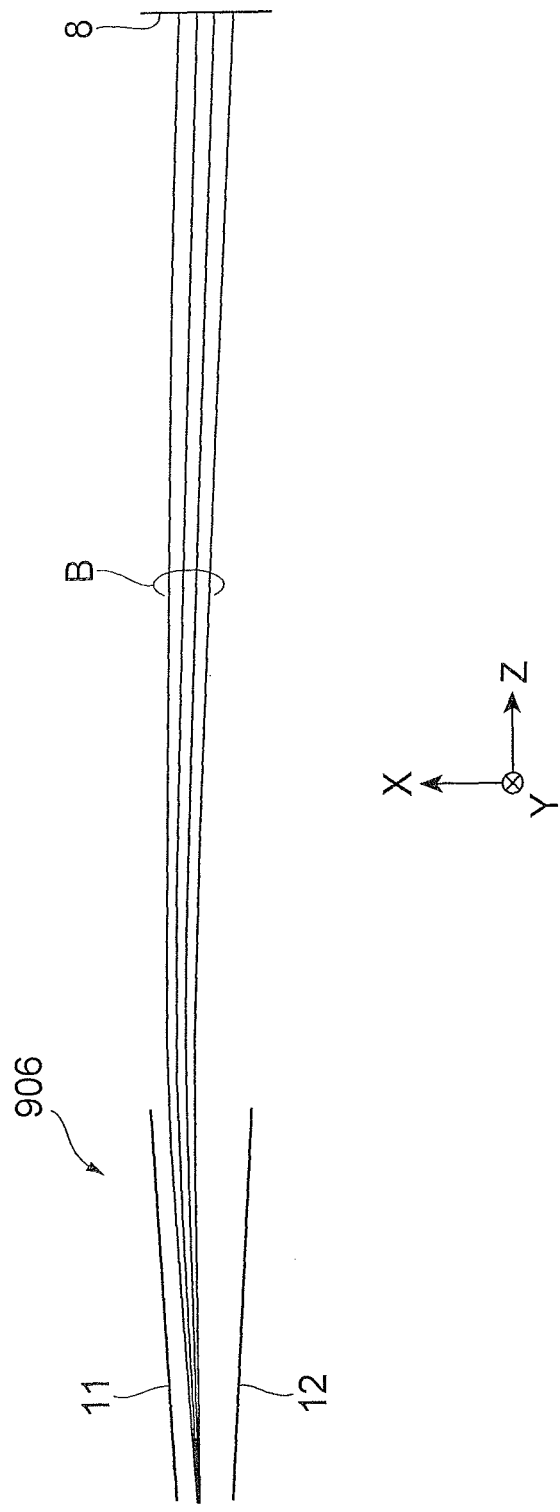
FIG. 19 is a drawing for explaining the cause of the variation of the positions of streak images.

FIG. 19 is a drawing showing trajectories of the electron beam B from the sweep electrode 906 to the phosphor screen 8 under execution of high-speed sweeping, which is a cross section along a plane perpendicular to the deflection plates 11, 12. An electric field formed by the two deflection plates 11, 12 causes the force directed toward the deflection plate 11 to act on the electron beam B entering the sweep electrode 906. The electric field changes at high speed in the period in which the electron beam B travels toward the phosphor screen 8, to invert the direction of the electric field. For this reason, the force directed toward the deflection plate 12 comes to act on the electron beam B and thus the trajectories of the electron beam B come to meander. As a consequence of this, the electron beam B passes near the deflection plate 11 during the period of migration of the electron beam B through the sweep electrode 906.

Therefore, the force due to the upper deflection plate 11 is dominant out of the forces exerted on the electrons by the electric field formed by the sweep voltages applied to the deflection plates 11, 12. For this reason, the forces F1, F2 act in total on the photoelectrons in the directions from the tube axis to the one edge 11a and the other edge 11b. Therefore, the intervals in the spatial direction (Y-axis direction) between the optical images are increased. By applying the above description, it is readily understood that the intervals in the spatial direction between the streak images of respective channels in FIG. 13 become larger and the intervals in the spatial direction become more prominent with increase of the sweep speed (or with increase of the temporal change of the sweep voltages).

In contrast to it, the streak tube 1A of the present embodiment is configured so as to make smaller the propagation distance difference which is the difference between the distance from the second connection portion 13b to which the voltage is applied, to the central part of the deflection plate 11 and the distance from the second connection portion 13b to the one edge 11a. Furthermore, it also makes smaller the propagation distance difference which is the difference between the distance from the second connection portion 13b to which the voltage is applied, to the central part of the deflection plate 11 and the distance from the second connection portion 13b to the other edge 11b. This suppresses the potential differences in the spatial direction (Y-axis direction) on the deflection plate 11. Therefore, it suppresses the variation of the positions of the streak images on the phosphor screen 8 and thus achieves implementation of high-accuracy multi-channel measurement.

Figure 5:
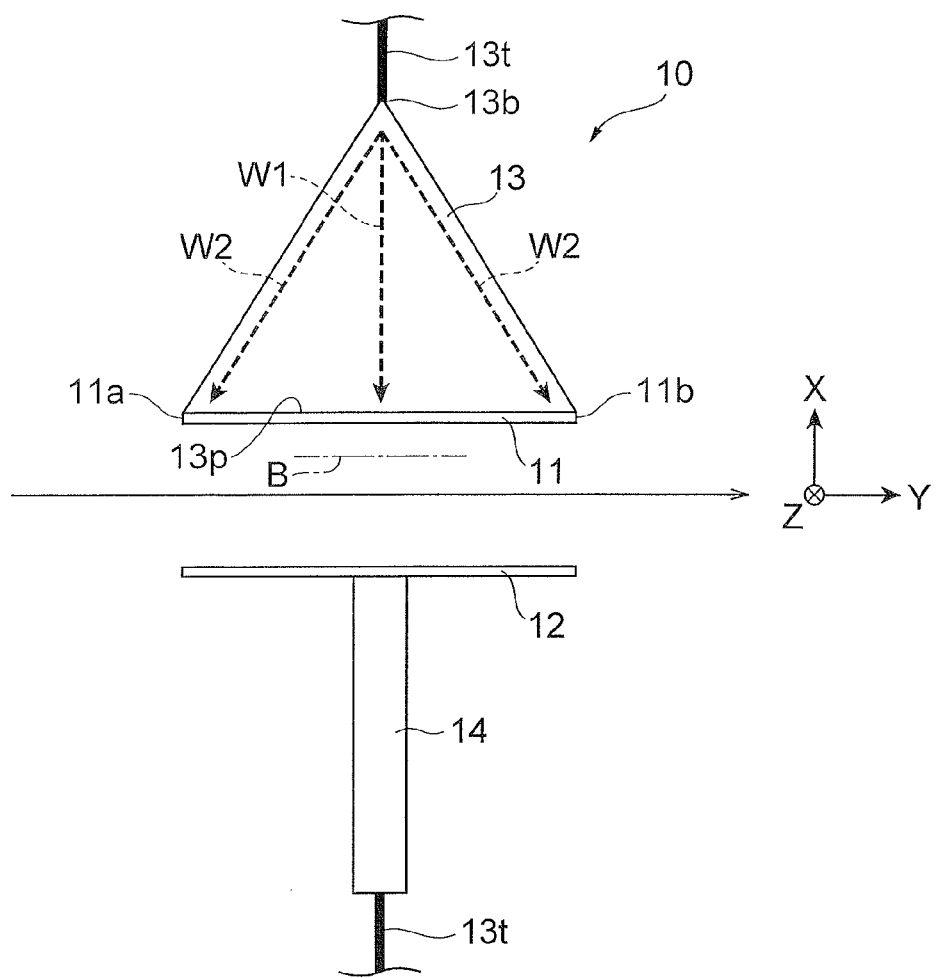
FIG. 5 is a drawing for explaining the effect of the streak tube of the first embodiment.

In order to confirm the effect of the streak tube 1A of the present embodiment, we calculated the potential differences made on the deflection plate 11 to which the connection lead 13 was connected. In the connection lead 13 shown in FIG. 5, the voltage applied from the pin 13t propagates through a propagation path W1 and propagation paths W2 to the deflection plate 11. FIG. 6(a) is a drawing for explaining a calculation model used in the calculation of the potential difference. The length D2 from the center EA of the connection lead 13 to the one edge 11a is 7.5 mm and the height H2 from the first connection portion 13a of the connection lead 13 to the second connection portion 13b is 20 mm. In the connection lead 13, a distance difference between the propagation path W1 and the propagation path W2 is approximately 1.36 mm. This distance difference is equivalent to about 4.5 psec in terms of time difference. The slant sweep voltage $Vd3(t)$ applied to the deflection plate 11 is assumed to have the voltage waveform shown in FIG. 6(b). Namely, the voltage applied to the deflection plate 11 changes from +800 V to −800 V in the period of 6 nsec. Therefore, the slope of the sweep voltage is approximately 0.267 V/psec (1600 V/6000 psec). Under this condition, the potential difference between the central part and the one edge 11a of the deflection plate 11 at each time is calculated to be approximately 1.20 V (0.267 V/psec×4.5 psec). Similarly, the potential difference between the central part and the other edge 11b of the deflection plate 11 at each time is approximately 1.20 V. This is the value smaller than the calculated value (6.7 V) in the case of the streak tube 900 of the conventional example. Therefore, it is understood that the streak tube 1A having the connection lead 13 is improved in the variation of the positions in the spatial direction, which can occur with increase of the sweep speed.

We produced the streak tube 1A using the connection lead 13 and checked variations of the electron beam B. Streak images were obtained with the sweep speed set at $1.4\times10^8$ m/sec. As a result, a variation of the electron beam B was 0.16 mm at the position of 6 mm from the center in the spatial direction (Y-axis direction) on the phosphor screen 8. This corresponds to the variation percentage of about 1.3% of the entire width of 12 mm in the Y-axis direction. It was, therefore, confirmed that the variation in position of the electron beam B was reduced to ⅓ when compared to the streak tube 900 of the conventional example with which the outward variation of the electron beam B was 0.48 mm.

It was confirmed by these confirmations that with the streak tube 1A of the present embodiment, the variation of the position in the spatial direction (Y-axis direction) of the electron beam B on the phosphor screen 8 was reduced to ⅓-¼ of that in the conventional example even if sweeping was conducted at the sweep speed as high as $1.4\times10^8$ m/sec. Therefore, degradation of positional accuracy in the spatial direction can be suppressed even with change of sweep speed in the multi-channel measurement. Accordingly, when the streak tube 1A of the present embodiment is applied to time-resolved spectrometry or the like, high-accuracy multi-channel measurement can be implemented.

Figure 7:
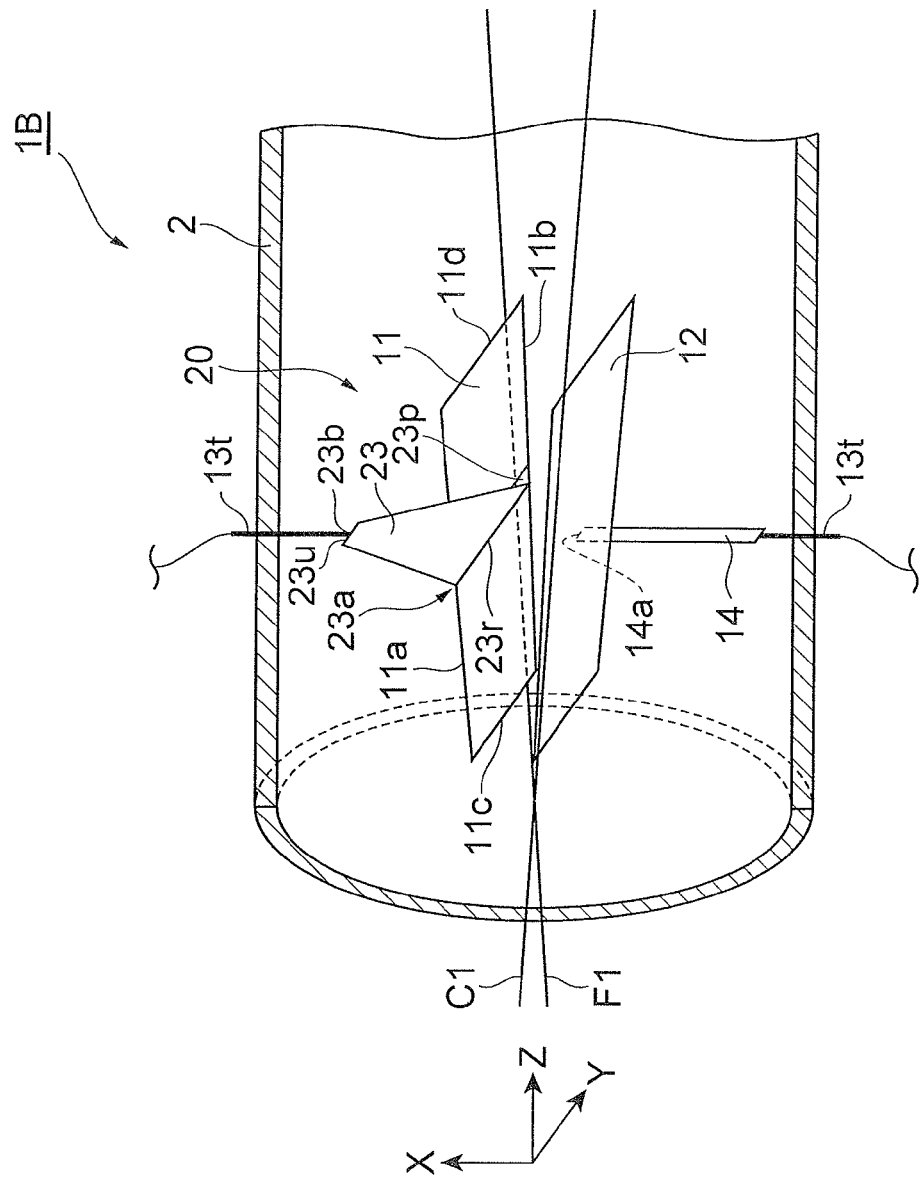
FIG. 7 is a drawing for explaining a configuration of the sweep electrode in the streak tube of the second embodiment.
Figure 8:
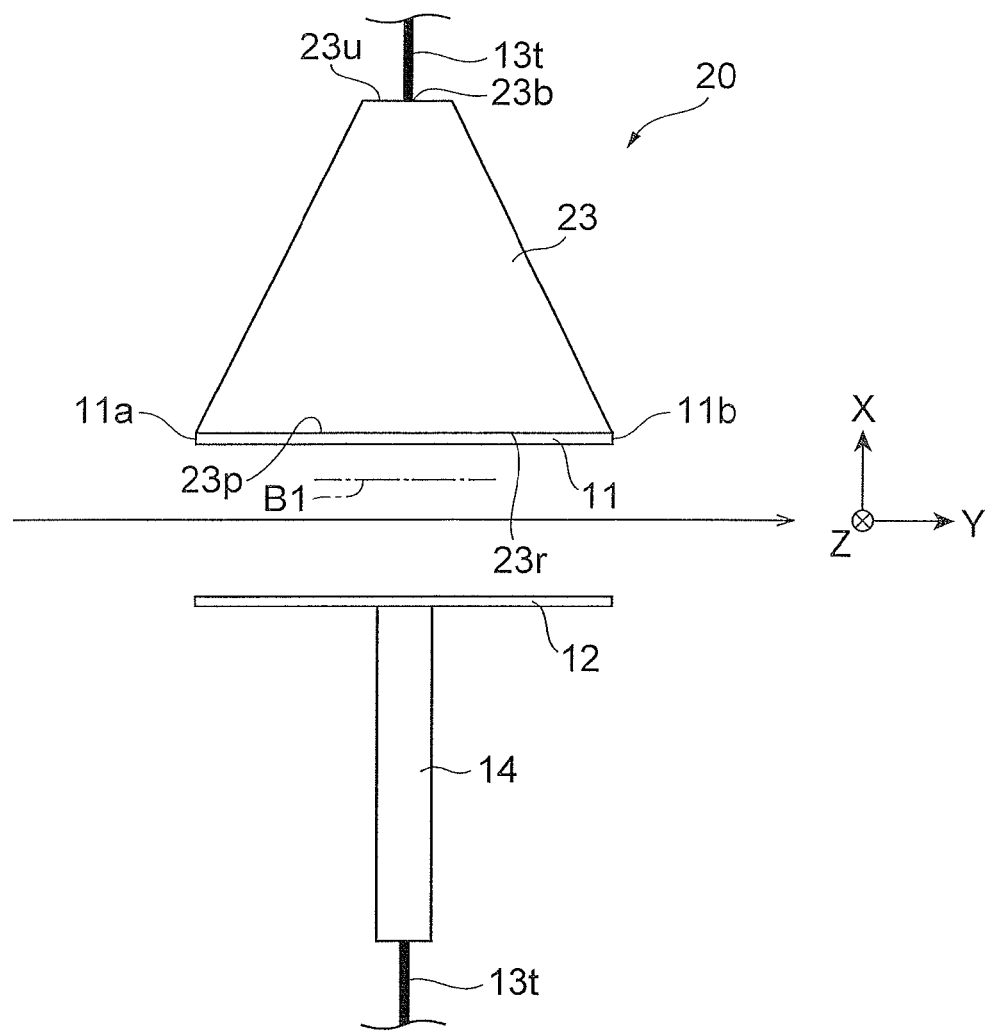
FIG. 8 is a drawing for explaining the configuration of the sweep electrode in the streak tube of the second embodiment.

The streak tube 1B of the second embodiment will be described. FIGS. 7 and 8 are drawings for explaining the configuration of the sweep electrode 20 in the streak tube 1B. The streak tube 1B of the second embodiment is different from the streak tube 1A of the first embodiment in that the shape of connection lead 23 is trapezoid. The other configuration is the same as in the streak tube 1A. The connection lead 23 will be described below.

The connection lead 23 is a plate member having the trapezoid shape. The connection lead 23 has an upper base part 23u being one of parallel sides, and a lower base part 23r being the other parallel side opposed to the upper base part 23u. The connection lead 23 has a first connection portion 23a along the lower base part 23r. The first connection portion 23a has a connection face 23p. When the connection lead 23 is connected to the deflection plate 11, the connection face 23p is connected to the one edge 11a and the other edge 11b of the deflection plate 11. Namely, the connection lead 33 is connected to the deflection plate 11 so that the lower base part 23r of the trapezoid coincides with the width of the deflection plate 11.

The connection lead 23 has a second connection portion 23b electrically connected to the pin 13t. The second connection portion 23b is provided on the upper base part 23u in the connection lead 23. The length of the upper base portion 23u is, for example, 3 mm. This configuration allows the pin 13t to be readily connected to the connection lead 23. When the connection lead 23 is compared, for example, with the case of the rectangular shape, it is feasible to suppress disturbance of the propagation paths of the slant sweep voltage and suppress degradation of the voltage waveform. Furthermore, when the connection lead 23 is compared, for example, with the case of the rectangular shape, it is feasible to suppress increase of capacitance and readily execute a synchronous scan operation with application of high-frequency sweep voltage.

Figure 9:
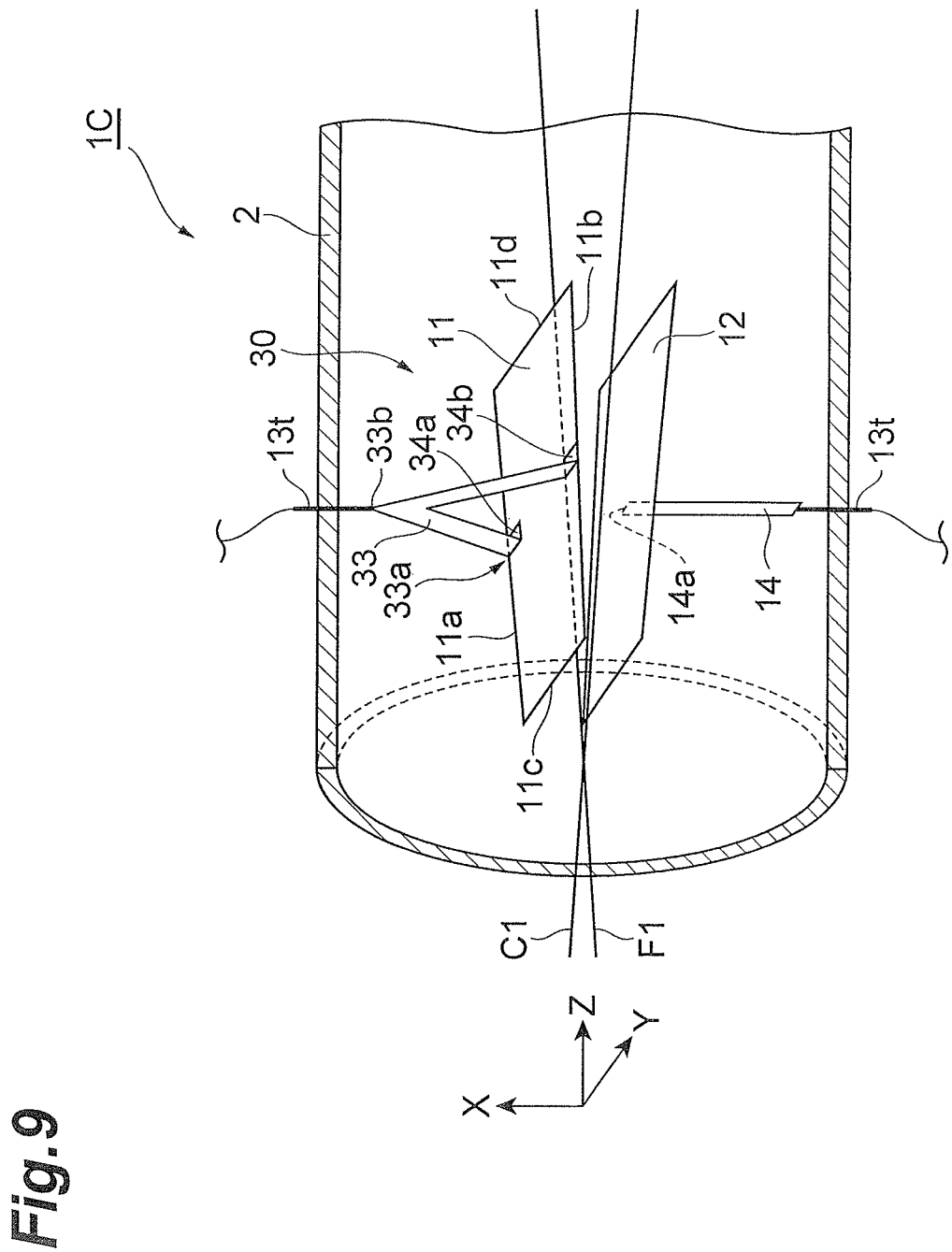
FIG. 9 is a drawing for explaining a configuration of the sweep electrode in the streak tube of the third embodiment.
Figure 10:
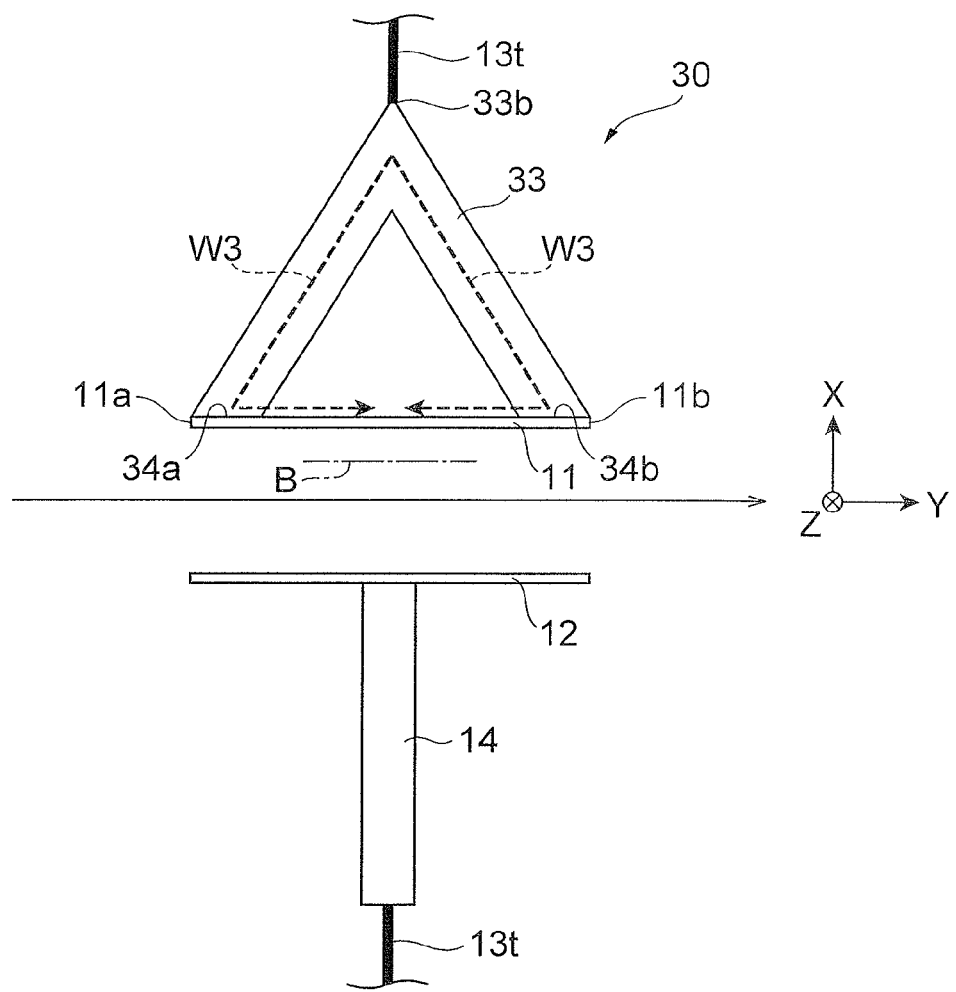
FIG. 10 is a drawing for explaining the configuration of the sweep electrode in the streak tube of the third embodiment.
Figure 11:
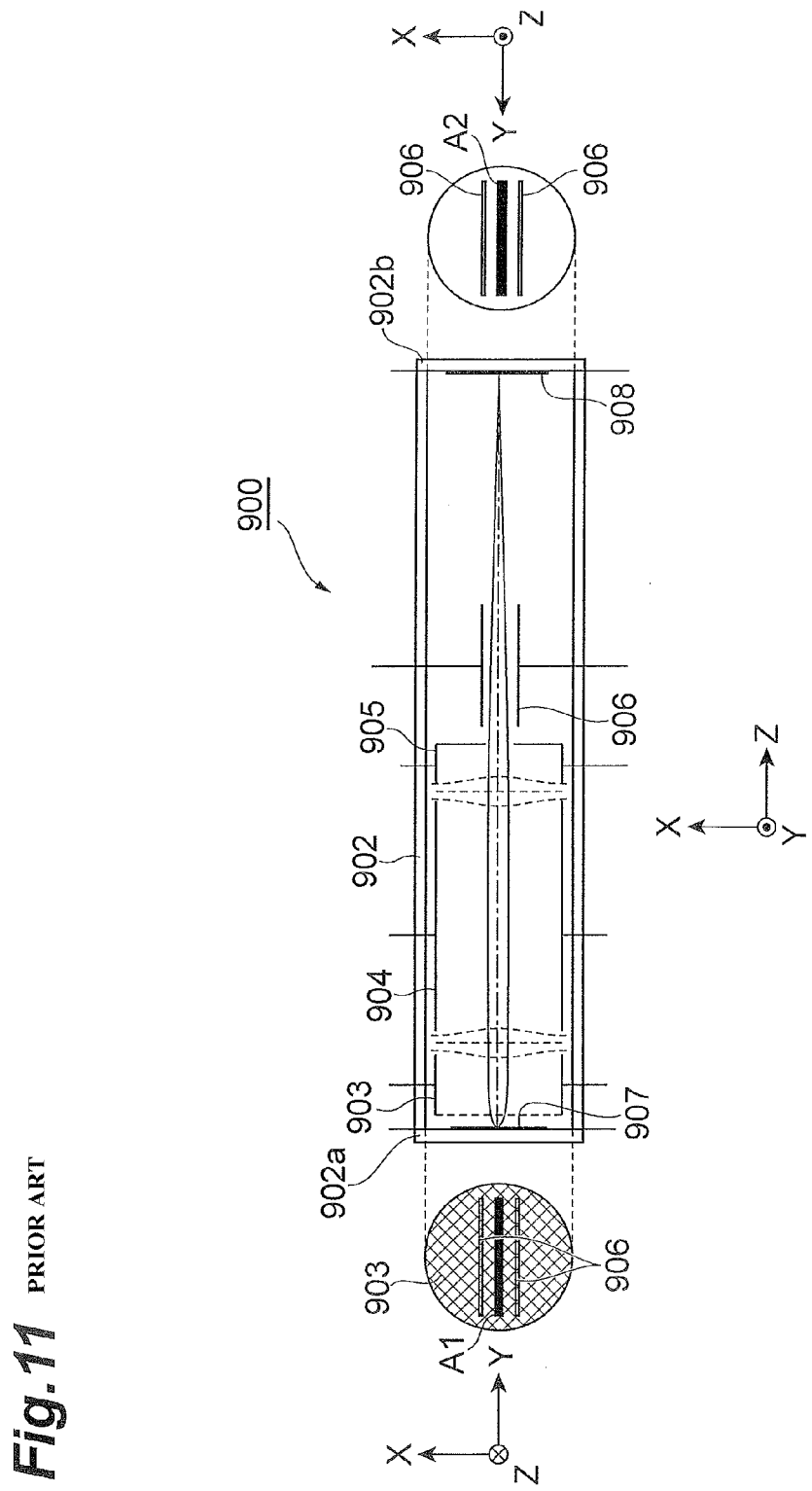
FIG. 11 is a drawing showing a cross section along a plane perpendicular to the deflection plates of the sweep electrode in the conventional streak tube, including its tube axis.
Figure 12:
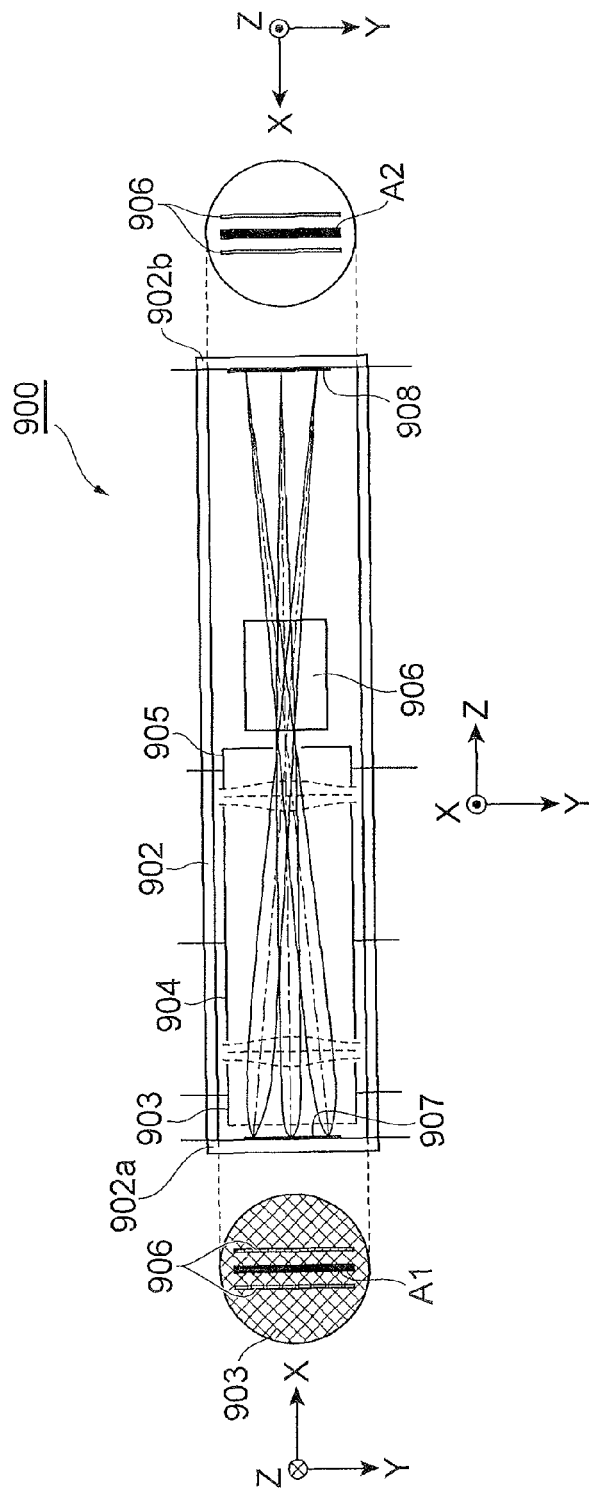
FIG. 12 is a drawing showing a cross section along a plane parallel to the deflection plates of the sweep electrode in the conventional streak tube, including its tube axis.

The streak tube 1C of the third embodiment will be described. FIGS. 9 and 10 are drawings for explaining the configuration of the sweep electrode 30 in the streak tube 1C of the third embodiment. The streak tube 1C of the third embodiment is different from the streak tube 1A of the first embodiment in that the streak tube 1C has the V-shaped sweep electrode consisting of two platelike leads coupled to each other on one end side. The other configuration is the same as in the streak tube 1A. The connection lead 33 will be described below.

The connection lead 33 has a first connection portion 33a, and a second connection portion 33b opposed to the first connection portion 33a and electrically connected to the pin 13t. The first connection portion 33a has a first end 34a and a second end 34b. The first end 34a is branched off from the second connection portion 33b and connected to the one edge 11a. The second end 34b is branched off from the second connection portion 33b and connected to the other edge 11b. The first end 34a and the second end 34b are separated from each other. The connection lead 33 is formed in such a configuration that the two platelike leads are integrated with and connected to each other on one end side. The platelike leads have, for example, the thickness of 0.5 mm and the width of 2 mm.

The connection lead 13 of the first embodiment is configured to make smaller the propagation distance difference which is the difference between the distance from the second connection portion 13b to which the voltage is applied, to the central part of the deflection plate 11 and the distance from the second connection portion 13b to the one edge 11a. Furthermore, it is configured to make smaller the propagation distance difference which is the difference between the distance from the second connection portion 13b to which the voltage is applied, to the central part of the deflection plate 11 and the distance from the second connection portion 13b to the other edge 11b. For this reason, a propagation time difference which is a difference between a propagation time from the second connection portion 13b to the central part and a propagation time from the second connection portion 13b to the opposing of edges 11a, 11b, is made smaller than in the conventional example. However, the distance of the propagation path W2 is longer than that of the propagation path W1 and thus the propagation time is also longer. In experiments, the propagation time difference calculated from the propagation distance difference tends to be larger than the time difference obtained by calculation.

FIG. 10 is a view obtained by viewing FIG. 9 from the photocathode 7 side. FIG. 10 shows propagation paths W3 in which the slant sweep voltage applied from the pin 13t propagates. In this case, each of the propagation time from the second connection portion 33b to the one edge 11a of the deflection plate 11 and the propagation time from the second connection portion 33b to the other edge 11b of the deflection plate 11 is shorter than the propagation time from the second connection portion 33b to the center of the deflection plate 11. We produced the streak tube 1C with the connection lead 33 shown in FIG. 10 and obtained the streak images by sweeping the electron beam B at the sweep speed of $1.4 \times 10^8$ msec. As a result, an outward variation of the electron beam B was 0.11 mm at the position of 6 mm from the center in the spatial direction (Y-axis direction) on the phosphor screen 8. This corresponds to about 0.92% of the entire width of 12 mm in the spatial direction. Therefore, it was confirmed that the potential differences were much smaller than in the case of the first embodiment and the outward variation of the electron beam B was further suppressed.

The above-described embodiments showed just the examples of the streak tubes according to the present invention. It should be noted that the streak tubes according to the present invention are not limited to the above embodiments. The streak tubes according to the present invention may be modified or applied to others without departing from the spirit and scope of the invention as described in the claims.

In the streak tubes 1A to 1C of the embodiments, the connection lead 13, connection lead 23, or connection lead 33 is connected to only one deflection plate 11, out of the pair of deflection plates 11, 12 of the sweep electrode 20, but the present invention does not always have to be limited to this. The connection lead 13, 23, or 33 may be connected to both of the deflection plate 11 and the deflection plate 12. With this configuration, the sweep voltage applied to the deflection plate 11 can have the voltage waveform varying from the positive voltage to the negative voltage and the sweep voltage applied to the deflection plate 12 can have the voltage waveform varying from the negative voltage to the positive voltage. Furthermore, the sweep voltage applied to the deflection plate 11 can have the voltage waveform varying from the negative voltage to the positive voltage and the sweep voltage applied to the deflection plate 12 can have the voltage waveform varying from the positive voltage to the negative voltage.

INDUSTRIAL APPLICABILITY

The streak tubes 1A to 1C suppress the variation of the positions of streak images and achieve implementation of high-accuracy multi-channel measurement.

REFERENCE SIGNS LIST 1A-1C, 900 streak tube; 2, 902 container; 2a entrance plate; 2b output plate; 3, 903 mesh electrode; 4, 904 focusing electrode; 5, 905 aperture electrode; 6, 906 sweep electrode; 7, 907 photocathode; 8, 908 phosphor screen; 10, 20, 30 sweep electrode; 11, 12 deflection plate; 11a one edge; 11b other edge; 11c front edge; 11d rear edge; 13, 14, 23, 33 connection lead; 13a, 14a first connection portion; 13b, 33b second connection portion; 13p connection face; 13t pin.

The invention claimed is:
1. A streak tube comprising:
a container having an entrance plate and an output plate;
a photocathode disposed in the container and configured to emit electrons according to light to be measured, the light having been incident through the entrance plate; and
a sweep electrode disposed in the container, having a first deflection plate and a second deflection plate for generating an electric field and a connection lead connected to each said deflection plate, and configured to sweep the electrons in a sweep direction along the output plate,
wherein opposing edges of the first deflection plate in a direction of the output plate are formed so as to extend in a direction from the entrance plate to the output plate,
wherein the connection lead connected to the first deflection plate has a first connection portion electrically connected to the first deflection plate, and
wherein the first connection portion is connected to the opposing edges,
wherein the container has a pin penetrating the container,
wherein the connection lead has a second connection portion electrically connected to the pin, and
wherein the first connection portion has a first end branching off from the second connection portion and connected to one of the edges and a second end branching off from the second connection portion and connected to the other of the edges.
2. The streak tube according to claim 1,
wherein the first connection portion has a connection face connected to the opposing edges.

3. The streak tube according to claim 1,
wherein the pair of connection leads are arranged at an identical position in a tube-axis direction of the container.

* * * * *